INVENTOR
LEO R. LOMBARDO
BY Bosworth, Sessions
Herrstrom & Cain
ATTORNEYS.

Sept. 9, 1969     L. R. LOMBARDO     3,466,543
ELECTRICAL METER SYSTEM EMPLOYING ELECTROLYTIC
COULOMETERS AS MEASURING INSTRUMENTS
Filed March 14, 1968     2 Sheets-Sheet 2

INVENTOR
LEO R. LOMBARDO
BY Bosworth, Sessions
Herrstrom & Cain
ATTORNEYS.

United States Patent Office 3,466,543
Patented Sept. 9, 1969

3,466,543
ELECTRICAL METER SYSTEM EMPLOYING ELECTROLYTIC COULOMETERS AS MEASURING INSTRUMENTS
Leo R. Lombardo, Lyndhurst, Ohio, assignor to Cleveland Technical Center, Inc., Cleveland, Ohio, a corporation of Ohio
Filed Mar. 14, 1968, Ser. No. 713,019
Int. Cl. G01r 7/02, 27/08
U.S. Cl. 324—140     10 Claims

ABSTRACT OF THE DISCLOSURE

An electrical metering system for determining ampere-hours, volt-hours, hours of operation under load, and total work done by a system of electrically powered machinery particularly a diesel-electric railway locomotive. The meter system comprises a coulometer which is connected with appropriate resistance to constitute an ampere-hour meter, another coulometer with resistance to constitute a volt-hour meter, and another coulometer connected with resistance and voltage regulating means to constitute an elapsed time meter whereby the indications of the various meters may be used separately or may be combined in known equations to yield the desired information.

BACKGROUND OF THE INVENTION

This invention relates to electrical meters and more particularly to a system of electrical meters for measuring ampere-hours, volt-hours, and total time under load of a system of electrically powered machinery.

Many systems of machinery must undergo maintenance checks at intervals of time and be overhauled or repaired if necessary. Likewise, particular machines may be rotated to various uses calling for different modes of operation in order to prolong their useful lives. In a system in which electrical power is used to drive machinery appropriate times for maintenance checks and rotation of use of a machine may be determined by information obtained from metering the electrical system. Useful items of information are such things as hours of operation under load, total ampere-hours delivered, total volt-hours developed, average values of current and voltage over the indicated time interval, and total work performed by the system. A railroad diesel-electric locomotive is an example of an electrically powered machine for which such information is desirable.

Conventional electrical meters, however, are complex, expensive and relatively fragile. They have often been found unsatisfactory for use in locomotives where they are required to withstand vibration, mechanical shock, temperature variation, and dirt. In addition, conventional meters are rather difficult for unskilled persons to read and the problems of indicating the work done by the system are increased if the current or voltage varies widely under normal system operating conditions, as for example in a diesel-electric locomotive traction motor system.

SUMMARY OF THE INVENTION

A general object of the invention is to provide an electrical metering system that overcomes the difficulties noted above that are encountered with meters of conventional types. Other objects are the provision of a metering system that is sturdy, reliable, economical and easy to read.

Briefly, a preferred embodiment of my invention comprises a plurality of electrolytic coulometers connected with appropriate resistances and, where necessary, voltage regulating means and rectification means to constitute ampere-hour, volt-hour, and elapsed time meters.

The electrolytic coulometer is inherently a current-time integrating device in that it indicates the amount of charge transferred from one terminal of the device to the other. One form of such a device is a transparent tube containing a mercury column and having immersed terminals at each end with a small volume of electrolyte positioned in the column between the terminals. The electrolyte is caused to move away from one terminal toward the other by the electrolytic transfer of the mercury from one terminal to the other, which is proportional to the quantity of electricity passing through the electrolyte. In this manner the movement of the electrolyte (as well as the movement of the mercury) indicates the amount of charge transferred and hence the current time integral of the circuit in which the meter is connected. A coulometer of this type is disclosed in Patent No. 3,045,178 to Lester Corrsin.

According to a preferred form of my invention a plurality of such electrolytic coulometers are combined with resistances and voltage regulating means to constitute a metering system. This metering system, when appropriately connected to a system of electrically powered machinery, yields directly, or by simple calculation, such information as hours of operation under load, ampere-hours, volt-hours, average values of current and voltage over the indicated time interval, and total megawatt-hours of energy consumed by the system. Such information is useful in determining when to initiate maintenance, overhaul, or rotation of use of a particular piece of machinery.

DESCRIPTION OF THE PREFERRED EMBODIMENT

Figure 1:
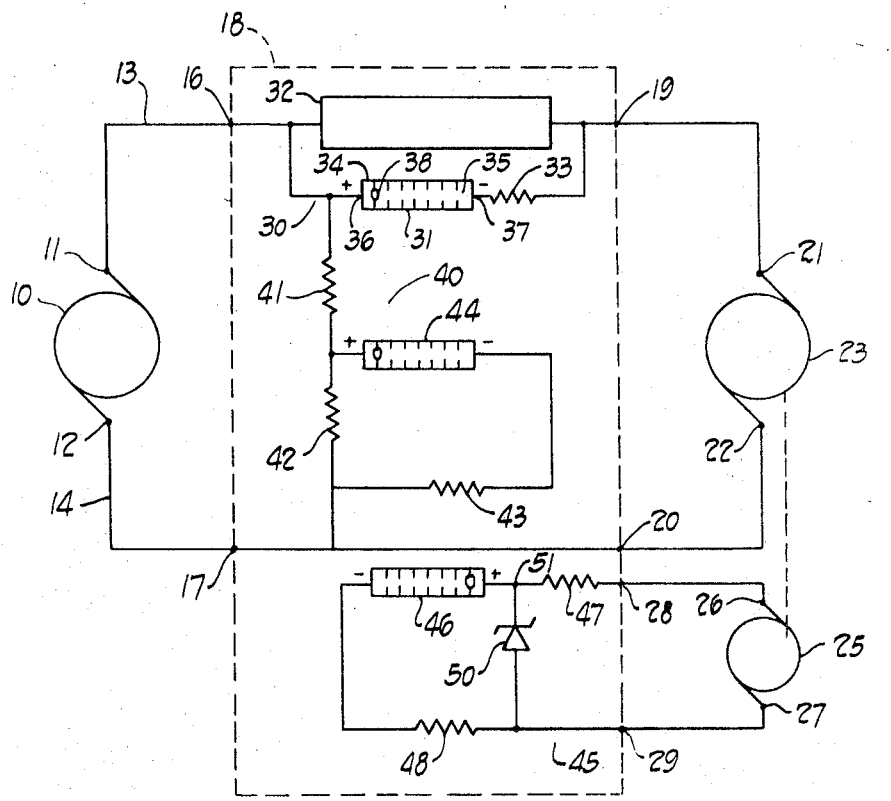
FIGURE 1 is a schematic representation of a preferred form of my invention connected in a system of electrically powered machinery.

FIGURE 1 illustrates in schematic form a portion of an electrical power system including a meter system according to the present invention. The electrical power system is described as being that of a diesel-electric locomotive. The system includes a main generator 10, which in this embodiment is a direct current generator, having terminals 11 and 12 connected by means of bus bars 13 and 14 to terminals 16 and 17 of a preferred form of meter system embodying my invention, generally designated 18. Terminals 19 and 20 of meter system 18 are connected to terminals 21 and 22 respectively of load 23. As seen on the diagram, terminals 17 and 20 of meter system 18 are electrically identical. Load 23 is shown as being a single load but actually may consist of several individual loads, such as the several traction motors of a diesel-electric locomotive. An auxiliary generator 25, which may be driven by load 23 as diagrammatically indicated by the dotted line, has its terminals 26 and 27 connected to terminals 28 and 29, respectively, of meter system 18 for a purpose to be more fully described hereinafter.

As a part of the meter system 18, and in order to measure the ampere-hour output of main generator 10 an ampere-hour meter generally designated 30 is interposed between main generator 10 and load 23. The meter comprises an electrolytic coulometer 31, a meter shunt 32, and a resistor 33.

The electrolytic coulometer 31 comprises a transparent tube 34 containing a broken column of mercury 35 and having terminals 36 and 37 that are immersed in the mercury at opposite ends of the tube. A quantity of electrolyte 38, which may be a water solution of potassium iodide and mercuric iodide, is positioned at the break in the mercury column. In response to current flow between terminals 36 and 37 through the mercury and the electrolyte mercury is transferred through the electrolyte and deposited at the opposite terminal. The electrolyte is thus caused to move away from one terminal and toward the other. The distance the electrolyte moves depends on the quantity of mercury transferred which in turn depends on the amount of current flowing through the mercury column and the time during which the current flows. The distance traveled by the electrolyte in the tube then indicates the product of the current flowing through coulometer 31 and the time during which it flows; i.e., the coulombs of electricity that flow through the tube.

As shown in FIGURE 1 the transparent tube 34 of coulometer 31 may be equipped with indicating marks at spaced intervals along its length. A line is formed at both interfaces between mercury and electrolyte, either of which may be used as a marker to indicate distance traveled by the electrolyte.

The coulometer has a finite range of current-time indication determined by its associated calibration resistors and its own characteristics. When that range is reached, that is, when electrolyte 38 has reached terminal 37, the device is reuseable merely by reversing it in the circuit.

In the power system depicted in FIGURE 1 large amounts of current will be drawn by load 23. Coulometer 31 is not placed directly in the load current path because the high currents might cause vaporization of the mercury in the transparent tube and because high current directly through the coulometer reduces the time that current can flow through the coulometer before its range is exceeded.

To extend the metering time of coulometer 31 and to protect it from excessively high currents a resistor 33 is placed in series with the coulometer, and a meter shunt 32 is placed in parallel with coulometer 31 and resistor 33. The resistance of meter shunt 32 is chosen to allow the high values of current required by load 23, while the value of resistor 33 is chosen to limit the amount of load current flowing through coulometer 31 to a small portion of the total load current. Coulometer 31 is thus protected from high currents and its time of use extended. The sensitivity in ampere-hours per division of coulometer 31 is determined by its own characteristics and by the ratio of the resistance of resistor 33 to meter shunt 32.

In FIGURE 1, ampere-hour meter 30 is shown connected in series with main generator 10 so as to read the entire output current of that generator. It will be appreciated, however, that ampere-hour meter 30 may be connected to read a part only of the current supplied by generator 10.

In order to indicate the volt-hour output of main generator 10, a volt-hour meter 40 is connected between terminals 16 and 17 of the meter system 18. Volt-hour meter 40 comprises resistors 41, 42 and 43 and electrolytic coulometer 44, which is similar to coulometer 31 described above. Resistor 41 is a voltage dropping resistor, the function of which is to reduce the level of voltage forcing current through coulometer 44 to a desired level. Resistor 41 and the resistance of the combination of resistors 42 and 43 and coulometer 44 form a voltage divider so that coulometer 44 indicates a current in response to a known percentage of the output voltage from generator 10. The value of resistor 43 is chosen to be much larger than that of resistor 42 to limit the current through coulometer 44 and also so that the resistance of the combination of resistors 42 and 43 and coulometer 44 will be very close to that of resistor 42 alone. By so doing, the values of resistors 42 and 43 may remain fixed while the value of resistor 41 may be changed, constituting it a multiplier or range determining resistor.

Coulometer 44, then, indicates a current-time product proportional to the voltage and time applied across resistor 42 and is calibrated in terms of that voltage-time product. That volt-hour indication multiplied by the ratio of the value of resistor 41 to the value of resistor 42 yields the output volt-hours of generator 10.

In order to indicate the system hours of operation under load, an elapsed time meter 45 as shown in FIGURE 1 is supplied by auxiliary generator 25 which in turn may be driven by load 23. Elapsed time meter 45 integrates time only when load 23 is being driven by mian generator 10. In a typical application of the invention load 23 will be a motor which drives the shaft of auxiliary generator 25. Voltage may be supplied to elapsed time meter 45 by any voltage output device having an output sufficiently constant to be regulated by a Zener diode or like means, and which supplies energy to elapsed time meter 45 only when main generator 10 is under load. Auxiliary generator 25 may be replaced by, for example, a voltage source and a switch actuated by load 23 which connects the voltage source to the elapsed time meter. Where load 23 is a motor the switch may be of the centrifugal type actuated by the motor.

Elapsed time meter 45 comprises electrolytic coulometer 46 (like coulometers 31 and 44), resistors 47 and 48, and Zener diode 50. The voltage output of auxiliary generator 25 is regulated by Zener diode 50, yielding essentially constant voltage at point 51 of elapsed time meter 45. This constant voltage produces constant current through resistor 48 and coulometer 46. Coulometer 46 integrates current and time but, since the current is constant, can be calibrated to indicate only the elapsed time during which main generator 10 has supplied power to load 23. Resistor 47 limits the current through Zener diode 50 while resistor 48 limits current through coulometer 46. The breakdown voltage of Zener diode 50 and the value of resistor 48 determine the constant value of current integrated with time and therefore the sensitivity in time per division of coulometer 46.

Figure 2:
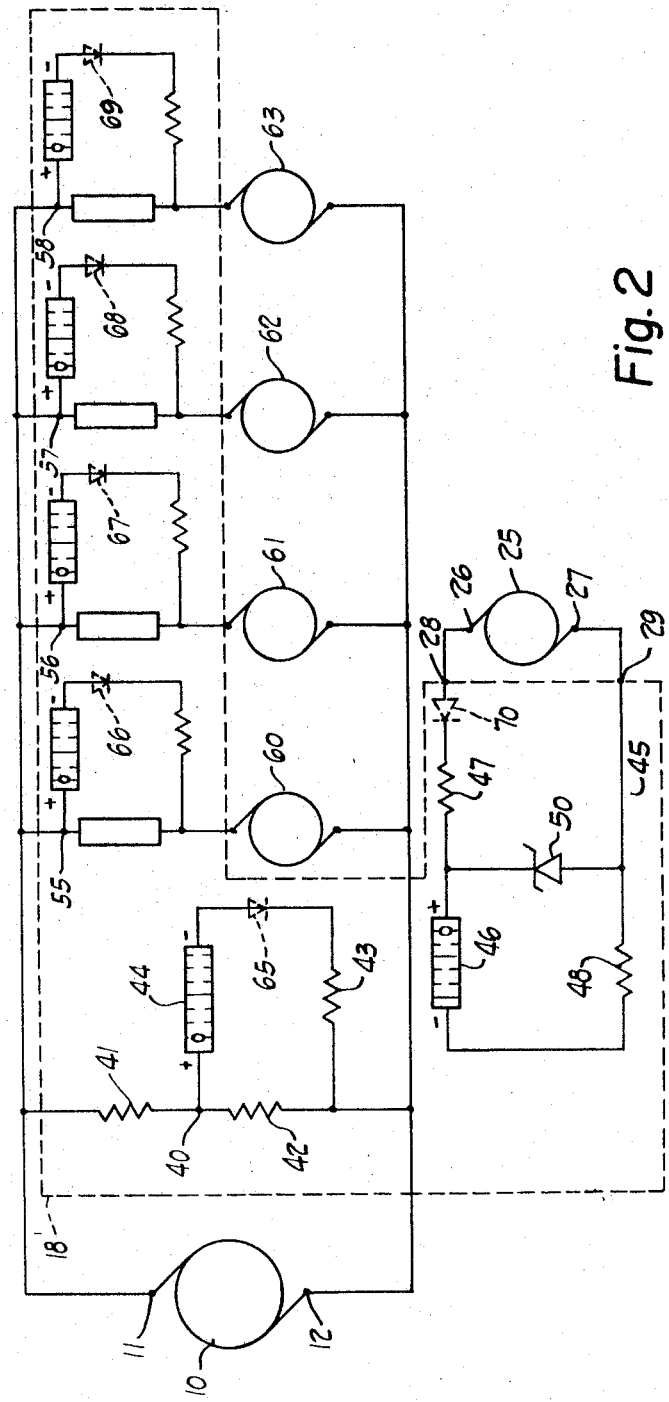
FIGURE 2 is a diagram of an electrical system having a plurality of loads and illustrating the use of my invention to measure the ampere-hours of each load.

FIGURE 2 illustrates the use of the invention in an electrical system having multiple loads. In FIGURE 2 the metering system 18' again contains volt-hour meter 40 and elapsed time meter 45. Instead of one ampere-hour meter metering main generator 10, however, ampere-hour meters 55, 56, 57 and 58 are shown metering separate loads 60, 61, 62 and 63 which may be the four traction motors of a diesel-electric locomotive. Under normal circumstances the ampere-hours taken by each traction motor will be the same but in case of impending malfunction of some type the disparity in ampere-hours between motors might provide an indication of the faulty condition.

While the metering system has been described in conjunction with a D.C. power system it may be adapted for use with an A.C. system by placing appropriate rectifying means in the various metering paths as illustrated by the diodes 65 through 70 in FIGURE 2.

The information supplied by the various meters may be combined in several ways to yield an indication of the condition, usage, and total work output of a diesel-electric locomotive on which the system is installed.

In a diesel-electric locomotive main generator 10 is normally of the type generating constant power output for a given control setting so that, in the normal operating range, if increased current is taken by the load, the generator voltage decreases to maintain constant power output.

In order not to exceed the individual voltage or current rating of main generator 10, traction motors 60 to 63 are caused to undergo several transitions or changes in excitation connections as the diesel-electric locomotive accelerates from standstill to rated speed. These stages allow maximum power output of the main generator 10 to be utilized at each transition stage without exceeding its current or voltage rating. Different locomotives then, depending on their use, will undergo different periods of time in which their traction motors are at each transition stage. This transition stage information is useful to maintenance personnel in allocating locomotives to different type functions and in determining when a maintenance check and rotation of use is due.

The information can be obtained in comparative fashion by dividing the ampere-hours or volt-hours taken by a particular locomotive by the hours of operation to obtain an average value of current or voltage supplied by main generator 10 over the time interval. Using this information a comparison can be obtained between locomotives of the relative time spent by each in high current-low voltage or low current-high voltage transition stages. Thus, a locomotive used for frequent starting and stopping jobs may be due for maintenance before one used for long hauls; the meters would provide such information.

Likewise the meters provide information as to elapsed time under load and megawatt-hours of energy delivered by main generator 10. Elapsed time under load is available directly while megawatt-hours are easily calculated as volt-hours times ampere-hours divided by hours. Such information is also useful to maintenance personnel.

As disclosed above, each separate traction motor may also be metered for ampere-hours and volt-hours so that malfunctions or impending malfunctions may be discovered.

As discussed above, conventional type electrical meters have not been found suitable for use in railroad locomotives. The present invention, however, provides a system which is rugged, not damaged by vibration, easy to use, not subject to inaccuracy because of temperature variations and reasonable in cost. The system is therefore particularly adapted to diesel-electric locomotives and other severe services.

I claim:

1. A meter system for electrically powered machinery having a generator and a load comprising, in combination, a first electrolytic coulometer, means for conducting to said first coulometer a uni-directional current proportional to the current flowing through said load, a second electrolytic coulometer, means for conducting to said second coulometer a uni-directional current proportional to the voltage across said load, a third electrolytic coulometer, and means for supplying to said third coulometer only during the time said generator is under load a substantially constant uni-directional current, whereby the indications of the various coulometers may be combined to yield the energy consumed, ampere-hours taken, volt-hours developed, time under load, and average values of current and voltage during the time under load.

2. The meter system of claim 1 wherein said means for supplying to said third coulometer only during the time said generator is under load a substantially constant uni-directional current comprises the combination of a resistance in series with said coulometer, a voltage regulator in parallel with said resistance and said coulometer, and D.C. voltage means controlled by said load to energize said voltage regulator only when said generator is under load, whereby the known constant voltage appearing at the terminals of said voltage regulator produces constant uni-directional current through said resistance and said coulometer.

3. The meter system of claim 1 wherein said generator is of the D.C. type and said means for conducting to said first coulometer a uni-directional current proportional to the current through said load comprises the combination of a resistance in series with said coulometer and a meter shunt in parallel with said coulometer and said resistance and in the path of current to said load.

4. The meter system of claim 1 wherein said generator is of the D.C. type and said means for conducting to said second coulometer a uni-directional current proportional to the voltage across said load comprises the combination of a first resistance connected in series with said coulometer and a second resistance connected across the terminals of said generator and in parallel with said coulometer and said first resistance.

5. The meter system of claim 4 wherein said means for conducting to said second coulometer a uni-directional current proportional to the voltage across said load includes a voltage dropping and range determining resistance connected in series with the combination of said first resistance, second resistance and coulometer.

6. The meter system of claim 1 wherein said means for supplying to said third coulometer only during the time said generator is under load a constant uni-directional current comprises the combination of a resistance in series with said coulometer, a voltage regulator in parallel with said resistance and said coulometer, a rectifier coupled to said voltage regulator, and A.C. voltage means controlled by said load to supply current to said rectifier only when said generator is under load whereby the known constant voltage appearing at the terminals of said voltage regulator produces constant uni-directional current through said resistance and said coulometer.

7. The meter system of claim 1 wherein said generator is of the A.C. type and said means for conducting to said first coulometer a uni-directional current proportional to the current through said load comprises the combination of a resistance in series with said coulometer, a rectifier in series with said resistance and said coulometer, and a meter shunt in parallel with said coulometer, said resistance, and said rectifier and in the path of current to said load.

8. The meter system of claim 1 wherein said generator is of the A.C. type and said means for conducting to said second coulometer a uni-directional current proportional to the voltage across said load comprises the combination of a first resistance connected in series with said coulometer, a rectifier connected in series with said coulometer and said resistance, and a second resistance connected across the terminals of said generator and in parallel with said coulometer, said first resistance, and said rectifier.

9. A meter system for electrically powered machinery having a D.C. generator energizing a motor comprising, in combination, a first electrolytic coulometer of the type in which an electrolyte comprising a water solution of potassium iodide and mercuric iodide moves in a transparent tube in response to the transfer of mercury from one terminal of the tube to the other, a first resistance in series with said first coulometer, a meter shunt in parallel with said first coulometer and said first resistance and in the path of current to said motor, a second electrolytic coulometer of the type in which an electrolyte comprising a water solution of potassium iodide and mercuric iodide moves in a transparent tube in response to the transfer of mercury from one terminal of the tube to the other, a second resistance in series with said second coulometer, a third resistance connected to one output terminal of said generator and in parallel with said second coulometer and said second resistance, a voltage dropping and range determining resistance connected to the remaining output terminal of said generator and in series with the combination of said second resistance, third resistance, and second coulometer, a third electrolytic coulometer of the type in which an electrolyte comprising a water solution of potassium iodide and mercuric iodide moves in a transparent tube in response to the transfer of mercury from one terminal of the tube to the other, a fourth resistance in series with said third coulometer, a voltage regulator in parallel with said fourth resistance and said third coulometer, a fifth resistance connected to one terminal of said voltage regulator, and an auxiliary D.C. generator driven by said motor having one output terminal connected to said fifth resistance and the remaining output terminal connected to the second terminal of said voltage regulator, whereby said first coulometer indicates the ampere-hours taken by said motor, said second coulometer indicates the volt-hours developed by said D.C. generator, said third coulometer indicates the time said D.C. generator has supplied current to said motor and the indications of the various coulometers may be combined to yield the energy consumed, ampere-hours taken, volt-hours developed, time under load, and average values of current and voltage during the time said motor is under load.

10. A meter system for electrically powered machinery having an A.C. generator energizing a motor comprising, in combination, a first electrolytic coulometer of the type in which an electrolyte comprising a water solution of potassium iodide and mercuric iodide moves in a transparent tube in response to the transfer of mercury from one terminal of the tube to the other, a first resistance in series with said first coulometer, a first rectifier in series with said first resistance and said first coulometer, a meter shunt in parallel with said first coulometer, first resistance, and first rectifier and in the path of current to said motor, a second electrolytic coulometer of the type in which an electrolyte comprising a water solution of potassium iodide and mercuric iodide moves in a transparent tube in response to the transfer of mercury from one terminal of the tube to the other, a second resistance in series with said second coulometer, a second rectifier in series with said second coulometer and said second resistance, a third resistance connected to one output terminal of said generator and in parallel with said second coulometer, second resistance, and second rectifier, a voltage dropping and range determining resistance connected to the remaining output terminal of said generator and in series with the combination of said second resistance, third resistance, second rectifier and second coulometer, a third electrolytic coulometer of the type in which an electrolyte comprising a water solution of potassium iodide and mercuric iodide moves in a transparent tube in response to the transfer of mercury from one terminal of the tube to the other, a fourth resistance in series with said third coulometer, a voltage regulator in parallel with said fourth resistance and said third coulometer, a fifth resistance connected to one terminal of said voltage regulator, a third rectifier in series with said fifth resistance and an auxiliary A.C. generator driven by said motor having one output terminal connected to said rectifier and the remaining output terminal connected to the second terminal of said voltage regulator, whereby said first coulometer indicates the ampere-hours taken by said motor, said second coulometer indicates the volt-hours developed by said A.C. generator, said third coulometer indicates the time said A.C. generator has supplied current to said motor and the indications of the various coulometers may be combined to yield the energy consumed, ampere-hours taken, volt-hours developed, time under load, and average values of current and voltage during the time said motor is under load.

References Cited
UNITED STATES PATENTS

| | | | |
|---|---|---|---|
| 2,595,373 | 5/1952 | Stewart | 324—142 XR |
| 3,045,178 | 7/1962 | Corrsin | 324—94 XR |
| 3,090,915 | 5/1963 | Soussloff et al. | |
| 3,343,083 | 9/1967 | Beusman. | |

RUDOLPH V. ROLINEC, Primary Examiner

A. E. SMITH, Assistant Examiner

U.S. Cl. X.R.

318—490; 322—99